(12) United States Patent
Yang et al.

(10) Patent No.: US 10,095,037 B2
(45) Date of Patent: Oct. 9, 2018

(54) HEAD MOUNTED ELECTRONIC DEVICE

(71) Applicant: SHENZHEN ROYOLE TECHNOLOGIES CO. LTD., Shenzhen (CN)

(72) Inventors: Songling Yang, Shenzhen (CN); Songya Chen, Shenzhen (CN); Chao Jiang, Shenzhen (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/057,877

(22) Filed: Mar. 1, 2016

(65) Prior Publication Data

US 2017/0055057 A1 Feb. 23, 2017

Related U.S. Application Data

(63) Continuation of application No. PCT/CN2015/087566, filed on Aug. 19, 2015.

(51) Int. Cl.
*G02B 27/01* (2006.01)
*H04R 1/10* (2006.01)
*H04R 5/033* (2006.01)

(52) U.S. Cl.
CPC ....... *G02B 27/0176* (2013.01); *H04R 1/1066* (2013.01); *H04R 1/1008* (2013.01); *H04R 5/0335* (2013.01)

(58) Field of Classification Search
CPC .... H04R 1/026; H04R 1/1066; H04R 1/1075; H04R 5/033; H04S 7/304
(Continued)

(56) References Cited

U.S. PATENT DOCUMENTS

| 5,003,300 A | 3/1991 | Wells |
| 5,321,416 A | 6/1994 | Bassett et al. |

(Continued)

FOREIGN PATENT DOCUMENTS

| CN | 2525546 Y | 12/2002 |
| CN | 2819243 Y | 9/2006 |

(Continued)

OTHER PUBLICATIONS

Chen, Office Action, U.S. Appl. No. 15/059,111, dated May 18, 2017, 10 pgs.

(Continued)

*Primary Examiner* — George C Monikang
(74) *Attorney, Agent, or Firm* — Morgan, Lewis & Bockius LLP

(57) ABSTRACT

The present invention relates to a head mounted electronic device, including a headphone and a display portion. The headphone includes a C-shaped elastic belt including two coupling ends; two movable members, each being rotatably coupled to a corresponding coupling end along a first axis; and two speakers, each being rotatably coupled to a corresponding movable component along a second axis. The display portion includes a main body, configured to produce and project images outwardly; and two coupling components, coupled to two opposite ends of the main body and each being rotatably coupled to a corresponding speaker along a third axis. Each of the two speakers is configured to rotate along the first axis and the second axis defined by a corresponding movable member, respectively, when the speaker rotates along its respective third axis in response to the movement of the display portion.

13 Claims, 3 Drawing Sheets

(58) Field of Classification Search
USPC .......................................... 381/370, 378–379
See application file for complete search history.

(56) References Cited

U.S. PATENT DOCUMENTS

| | | | |
|---|---|---|---|
| 5,737,012 | A | 4/1998 | Tabata et al. |
| 5,903,395 | A | 5/1999 | Rallison |
| 6,369,952 | B1 | 4/2002 | Rallison et al. |
| 6,421,031 | B1 | 7/2002 | Ronzani et al. |
| 6,424,321 | B1 | 7/2002 | Ronzani et al. |
| 8,577,427 | B2 | 11/2013 | Serota |
| 2002/0005819 | A1 | 1/2002 | Ronzani et al. |
| 2002/0094094 | A1* | 7/2002 | Shin ............... H04R 1/1066 381/104 |
| 2002/0163486 | A1 | 11/2002 | Ronzani et al. |
| 2004/0201695 | A1 | 10/2004 | Inasaka |
| 2006/0062417 | A1* | 3/2006 | Tachikawa ........ H04R 1/1066 381/378 |
| 2006/0072206 | A1 | 4/2006 | Tsuyuki et al. |
| 2007/0256107 | A1 | 11/2007 | Anderson, Jr. et al. |
| 2009/0115687 | A1 | 5/2009 | Chiaki |
| 2012/0069448 | A1 | 3/2012 | Sugihara et al. |
| 2012/0098971 | A1 | 4/2012 | Hansen et al. |
| 2012/0162764 | A1 | 6/2012 | Shimizu |
| 2012/0244813 | A1 | 9/2012 | Liao et al. |
| 2013/0195308 | A1* | 8/2013 | Tankersley ............ A61F 11/06 381/378 |
| 2014/0078333 | A1 | 3/2014 | Miao |
| 2014/0133670 | A1* | 5/2014 | Lee ............... H04R 5/0335 381/74 |
| 2014/0272915 | A1 | 9/2014 | Higashino et al. |
| 2014/0320972 | A1 | 10/2014 | Magyari et al. |
| 2014/0364208 | A1 | 12/2014 | Perry |
| 2014/0364209 | A1 | 12/2014 | Perry |
| 2015/0016654 | A1 | 1/2015 | Serota |
| 2015/0103606 | A1 | 4/2015 | Seong |
| 2016/0005231 | A1 | 1/2016 | Yamaga |
| 2016/0018659 | A1 | 1/2016 | Miyagawa |
| 2016/0044981 | A1 | 2/2016 | Frank et al. |
| 2016/0249124 | A1 | 8/2016 | Drinkwater et al. |
| 2016/0349519 | A1 | 12/2016 | Yang et al. |
| 2016/0366502 | A1 | 12/2016 | Morris et al. |
| 2017/0052378 | A1 | 2/2017 | Yang et al. |
| 2017/0055061 | A1 | 2/2017 | Yang et al. |
| 2017/0055079 | A1 | 2/2017 | Yang et al. |
| 2017/0075121 | A1 | 3/2017 | Chen et al. |
| 2017/0090201 | A1 | 3/2017 | Guo |

FOREIGN PATENT DOCUMENTS

| | | |
|---|---|---|
| CN | 2938154 Y | 8/2007 |
| CN | 101336008 A | 12/2008 |
| CN | 201336696 Y | 10/2009 |
| CN | 102387442 A | 3/2012 |
| CN | 202455514 U | 9/2012 |
| CN | 102918443 A | 2/2013 |
| CN | 103149690 A | 6/2013 |
| CN | 103581779 A | 2/2014 |
| CN | 103596099 A | 2/2014 |
| CN | 103702257 A | 4/2014 |
| CN | 203747962 U | 7/2014 |
| CN | 104166239 A | 11/2014 |
| CN | 104254037 A | 12/2014 |
| CN | 204180248 U | 2/2015 |
| CN | 204229050 U | 3/2015 |
| CN | 104503083 A | 4/2015 |
| CN | 104503086 A | 4/2015 |
| CN | 104503584 A | 4/2015 |
| CN | 104503585 A | 4/2015 |
| CN | 204302573 U | 4/2015 |
| CN | 104635340 A | 5/2015 |
| CN | 104765149 A | 7/2015 |
| CN | 104793338 A | 7/2015 |
| CN | 204575970 U | 8/2015 |
| CN | 204666953 U | 9/2015 |
| JP | 2007243631 A | 9/2007 |
| JP | 2010145859 A | 7/2010 |
| WO | WO2007119351 A1 | 10/2007 |

OTHER PUBLICATIONS

Chen, Notice of Allowance, U.S. Appl. No. 15/059,111, dated Sep. 7, 2017, 7 pgs.
Guo, Office Action, U.S. Appl. No. 15/059,119, dated Aug. 24, 2017, 9 pgs.
International Search Report and Written Opinion, PCTCN2015080363, dated Feb. 3, 2016, 9 pgs.
International Search Report and Written Opinion, PCT/CN2015/087565, dated May 23, 2016, 9 pgs.
International Search Report and Written Opinion, PCT/CN2015/087566, dated Jan. 13, 2016, 9 pgs.
International Search Report and Written Opinion, PCT/CN2015/087564, dated May 10, 2016, 9 pgs.
International Search Report and Written Opinion, PCT/CN2015/087568, dated Jan. 13, 2016, 12 pgs.
International Search Report and Written Opinion, PCT/CN2015/089564, dated May 27, 2016, 7 pgs.
International Search Report and Written Opinion, PCT/CN2015/090860, dated Jul. 21, 2016, 11 pgs.
Yang, Office Action, U.S. Appl. No. 15/058,913, dated May 8, 2017, 13 pgs.
Yang, Office Action, U.S. Appl. No. 15/059,104, dated Apr. 21, 2017, 10 pgs.
Yang, Notice of Allowance, U.S. Appl. No. 15/059,104, dated Sep. 26, 2017, 8 pgs.
Guo, Final Office Action, U.S. Appl. No. 15/059,119, dated Dec. 28, 2017, 12 pgs.
Guo, Notice of Allowance, U.S. Appl. No. 15/059,119, dated Mar. 19, 2018, 7 pgs.
Yang, Final Office Action, U.S. Appl. No. 15/058,913, dated Nov. 3, 2017, 15 pgs.
Yang, Office Action, U.S. Appl. No. 15/056,851, dated Sep. 25, 2017, 7 pgs.
Yang, Final Office Action, U.S. Appl. No. 15/056,851, dated Dec. 26, 2017, 9 pgs.
Yang, Notice of Allowance, U.S. Appl. No. 15/056,851, dated Apr. 6, 2018, 7 pgs.
Yang, Office Action, U.S. Appl. No. 15/056,930, dated May 18, 2018, 15 pgs.
Yang, Notice of Allowance, U.S. Appl. No. 15/058,913, dated May 17, 2018, 7 pgs.

* cited by examiner

HEAD MOUNTED ELECTRONIC DEVICE

RELATED APPLICATION

This application is a continuation application of PCT Patent application No. PCT/CN2015/087566, entitled "HEAD MOUNTED ELECTRONIC DEVICE" filed on Aug. 19, 2015, which is incorporated by reference in its entirety.

TECHNICAL FIELD

The present invention relates to head mounted electronic devices, and more particularly to a head mounted electronic device with a headphone and a display portion capable of rotating relative to each other.

BACKGROUND

Head mounted electronic device is a near-eye display device. It produces images and projects the images to the eyes of the user, so that the user can see the magnified images and obtain a display effect of large area. Most of the existing head-mounted electronic devices have their audio signals transmitted to the user via earplugs, but the acoustic effect obtained from the earplugs is not satisfactory. There are existing products providing headphone jacks for the user to plug in headphones with better acoustic effects. However, this solution makes it difficult to wear, and it is also inconvenient to carry the headphone and the head mounted electronic device separately.

SUMMARY

In view of the above, the implementation ways of the present invention provide a head mounted electronic device with a headphone and a display portion capable of rotating relative to each other.

A head mounted electronic device, includes a headphone and a display portion. The headphone includes a C-shaped elastic belt including two coupling ends; two movable members each being rotatably coupled to a corresponding coupling end along a first axis; and two speakers each being rotatably coupled to a corresponding movable member along a second axis. The display portion includes a main body, configured to produce and project images outwardly, and two coupling components coupled to two opposite ends of the main body and each is rotatably coupled to a corresponding speaker along a third axis.

In the present invention, each of the two speakers is configured to rotate along the first axis and the second axis defined by a corresponding movable member, respectively, when the speaker moves in response to the rotation of the display portion along its respective third axis, thereby avoiding or reducing the twist of the elastic belt and the corresponding coupling component, and also rotating the display portion to a position substantially overlapping with the headphone.

BRIEF DESCRIPTION OF THE DRAWINGS

The following figures are used for illustrating embodiments of the present invention in detail in combination with specific implementation ways. It should be understood that, components in the figures do not represent the actual size and the proportion relationship, they are only to clearly illustrate the embodiments, and should not be understood as limitation to the present invention.

DETAILED DESCRIPTION

In order to make the purpose, technical solution, and advantages of the present invention clearly, the following embodiments and the drawings will be described to further illustrate the present invention. It should be understood that, the following described specific implementation ways are only used for explaining the present invention, not limiting the present invention. In addition, the content shown in the figures does not represent actual proportion relationships between the components of the present invention, just for illustrating. It must be pointed out that, in the present invention, the mentioned "connections" or "couple" between two components may not be a direct connection, also can be achieved by indirect connection through a third component.

Figure 1:
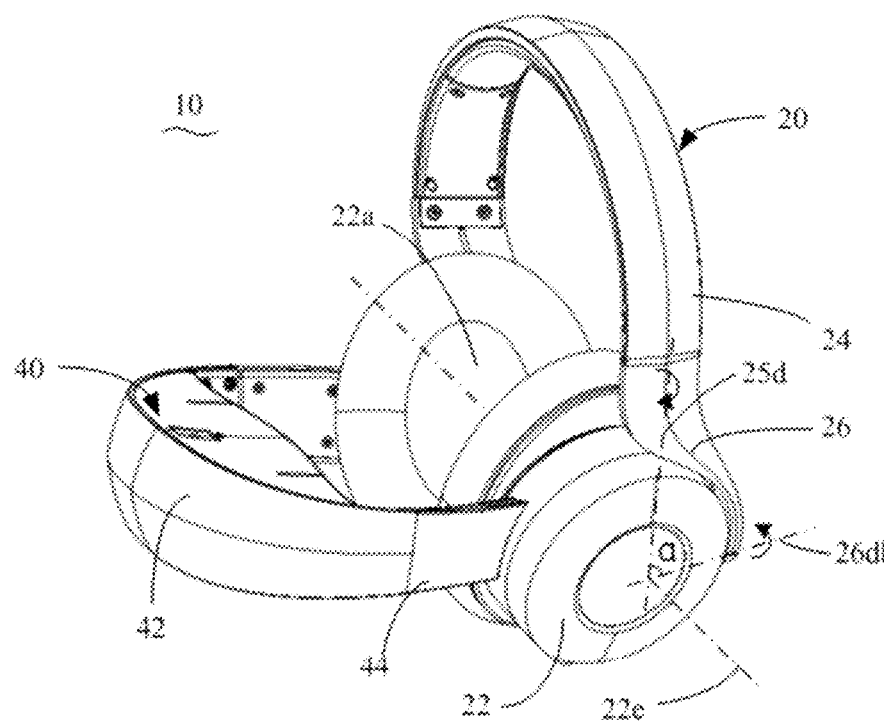
FIG. 1 is a schematic view of a structure of a head mounted electronic device in accordance with an embodiment of the present invention, wherein, a headphone and a display portion are in a spread state.
Figure 5:
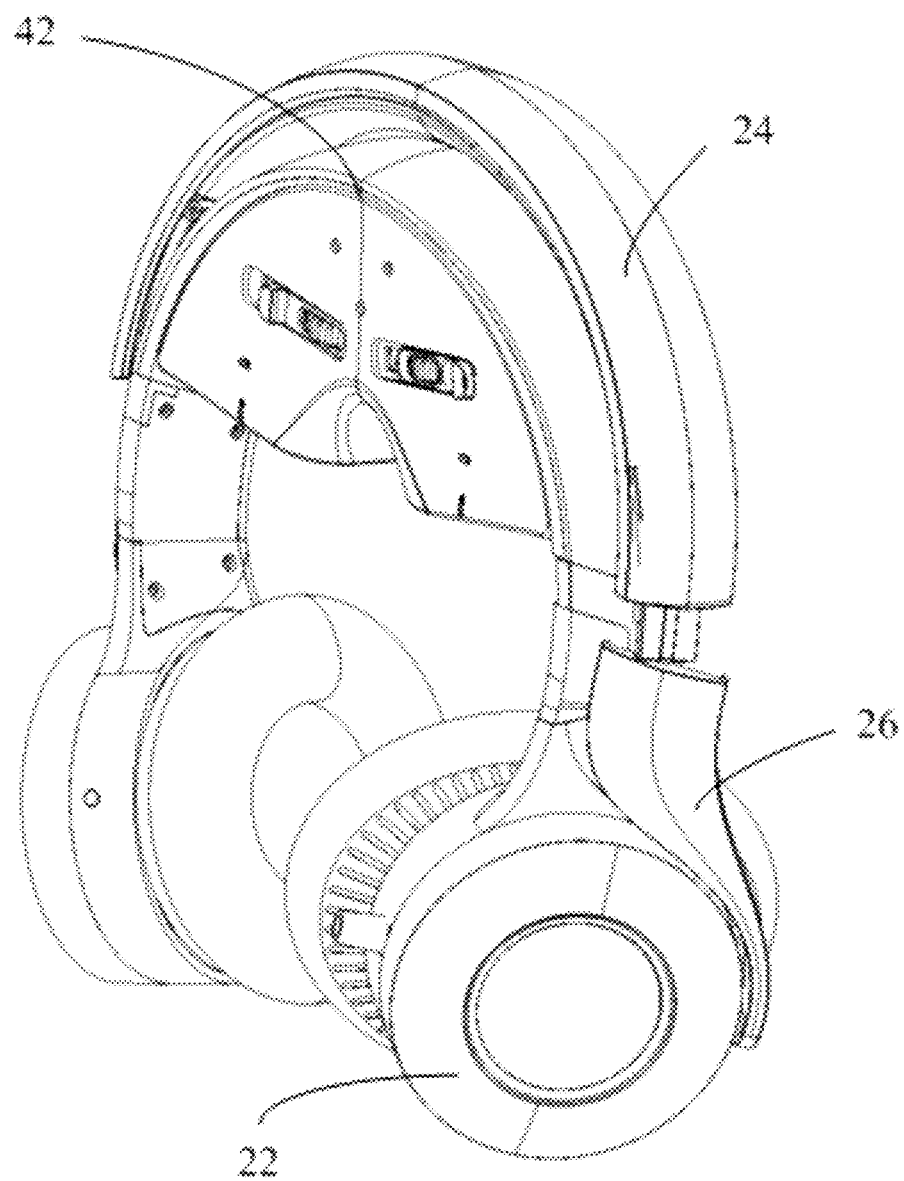
FIG. 5 is a schematic view of a structure showing that the headphone and the display portion of the head mounted electronic device in FIG. 1 are in a tucked state.

FIG. 1 is a schematic view of a head mounted electronic device 10 of a first embodiment of the present invention. The head mounted electronic device 10 can be a head mounted video player, a head mounted game machine, a head mounted navigator, etc. The head mounted electronic device 10 includes a headphone 20 and a display portion 40. The display portion 40 is rotatably coupled to the headphone 20. When in use, the display portion 40 can rotate to a position defining an angle of approximately 90 degrees relative to the headphone 20, as illustrated by FIG. 1. After the user puts the headphone 20 on his head, the display portion 40 is located in front of his eyes and projects images to the eyes; when not being used, the display portion 40 can be rotated to a position substantially overlapping with the headphone 20, which is convenient to store the head mounted electronic device 10, as illustrated by FIG. 5.

Figure 2:
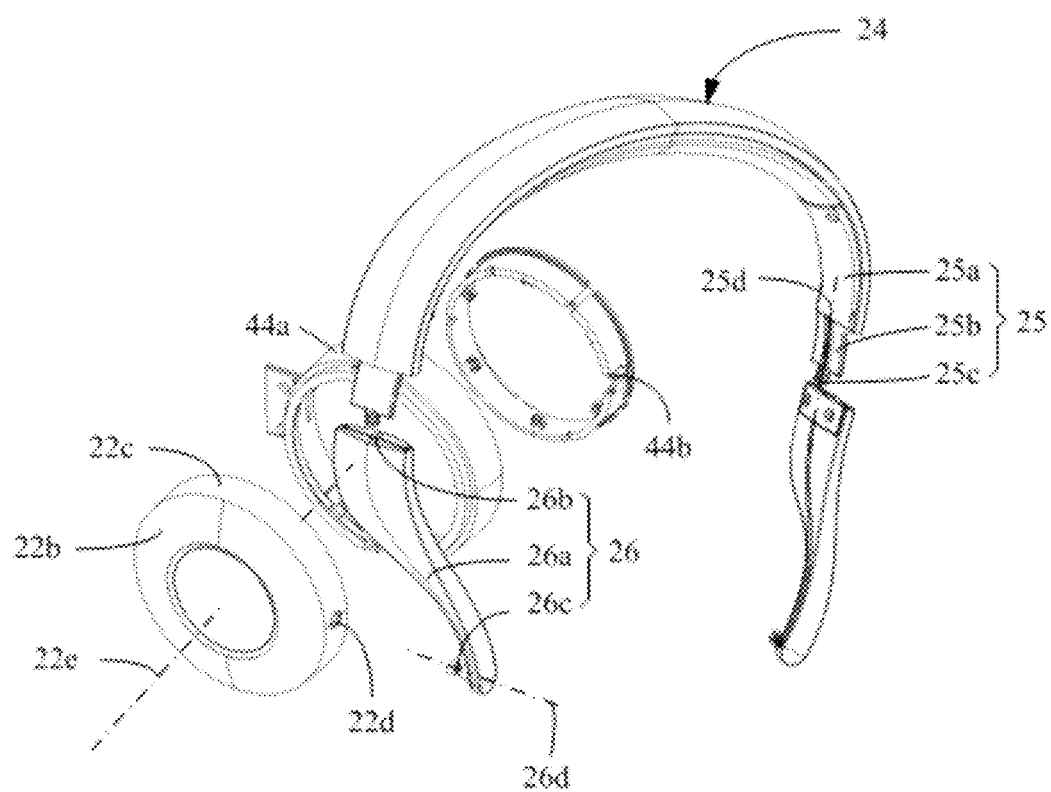
FIG. 2 is an exploded, schematic view of a portion of the head mounted electronic device in FIG. 1.

In detail, referring to FIG. 1 and FIG. 2, the headphone 20 includes two speakers 22, an elastic belt 24 and two movable members 26 configured to rotatably couple the two speakers 22 to the elastic belt 24. The elastic belt 24 is substantially C-shaped and includes two coupling ends 25 located at one C-shaped opening. In the illustrated embodiment, each coupling end 25 includes a receiving part 25a and a first sliding member 25b capable of slidably retracting into the receiving part 25a. The first sliding member 25b has a first protrusion pole 25c extending from an end thereof remote from the receiving part 25a. The first sliding member 25b is capable of partially sliding out of the receiving part 25a. The first protrusion pole 25c defines a first axis 25d. The first sliding member 25b is arranged to permit the user to adjust a distance between the elastic belt 24 and the speaker 22. However, it can be understood that, when the elastic belt 24 is stretchable, or the distance between the elastic belt 24 and speaker 22 is not needed to be adjusted, the first sliding member 25b can be omitted.

Each movable component 26 is rotatably coupled to a corresponding coupling end 25 along the first axis 25d, to thereby be capable of taking the first axis 25d as the rotation axis when rotating relative to the coupling end 25. In the illustrated embodiment, the movable component 26 is substantially curved in shape, and includes a curved main portion 26a, a first blind hole 26b inwardly concaved from an end of the main portion 26a adjacent to the coupling end 25, and a second protrusion pole 26c extending from the opposite end of the main portion 26a toward the speaker 22. The first protrusion pole 25c is inserted and locked into the first blind hole 26b, to thereby make the first protrusion pole 25c be capable of rotating within the first blind hole 26b.

Each speaker 22 is rotatably coupled to a corresponding movable member 26 along a second axis 26d, to thereby be capable of taking the second axis 26d as the rotation axis when rotating relative to the movable member 26. In the illustrated embodiment, each speaker 22 includes an inner wall 22a configured to transmit sound, an opposite outer wall 22b, and a side wall 22c extending from the outer wall 22b toward the inner wall 22a. The outer wall 22b and the side wall 22c collectively define a cavity (not shown), the speaker 22 has a trumpet (not shown) located inside the cavity and a speaking side of the trumpet facing the inner wall 22a. The side wall 22c defines a second hole 22d. The second protrusion pole 26c is inserted into the second hole 22d, and locked in the cavity, to thereby make the speaker 22 is rotatable relative to the second protrusion pole 26c, that is to say, the second protrusion pole 26c defines the second axis 26d. The second axis 26d and the first axis 25d define an angle α therebetween. The speaker 22 and the movable member 26 are rotatable along the first axis 25d, the speaker 22 is further rotatable along the second axis 26d, to thereby enable the speaker 22 to achieve multi-dimensional rotations. It should be pointed out that, the arrangement of the protrusion poles 25c, 26c and the holes 26b, 22d can be reversed. For example, the movable member can include the first protrusion pole 25c, the first blind hole 26b is defined in the coupling end 25.

The display portion 40 includes a main body 42 and two coupling components 44. The main body 42 is configured to produce and project images outwardly towards the user's eyes. Specifically, the main body 42 is configured to include an image producing device and an optical module (not shown), images produced by the image producing device are projected in preset directions by the optical module. The main body 42 is further constructed to have an adjusting mechanism (not shown), the adjusting mechanism is configured to adjust a distance between the image producing device and the optical module, to thereby fit the near-sighted or far-sighted users. The adjusting mechanism can further be configured to adjust a distance between combinations of the image producing device and the optical module, to thereby fit the interpupillary distances of different users.

The two coupling components 44 are coupled to two opposite ends of the main body 42 and each is also rotatably coupled to a corresponding speaker 22 along a third axis 22e. The third axis 22e extends from the outer wall 22b of the speaker 22 toward the corresponding inner wall 22a. The display portion 40 is capable of rotating to a position apart away from the headphone 20, as illustrated by FIG. 1, and a position substantially overlapping with the headphone 20, as illustrated by FIG. 5. In the illustrated embodiment, the side wall 22c of the speaker 22 is a cylindrical wall, the coupling component 44 has an end thereof, adjacent to the speaker 22, forming a ring 44a. The ring 44a is also a cylindrical wall and it is coupled to the side wall 22c of the speaker 22 by a clamping member 44b, the ring 44a is thus rotatable around the side wall 22c. Thus, the side wall 22c of the speaker 22 defines the third axis 22e which is also its central axis. Here, the third axis 22e is substantially perpendicular to a corresponding first axis 25d and/or a corresponding second axis 26d on the same side of the device.

Figure 3:
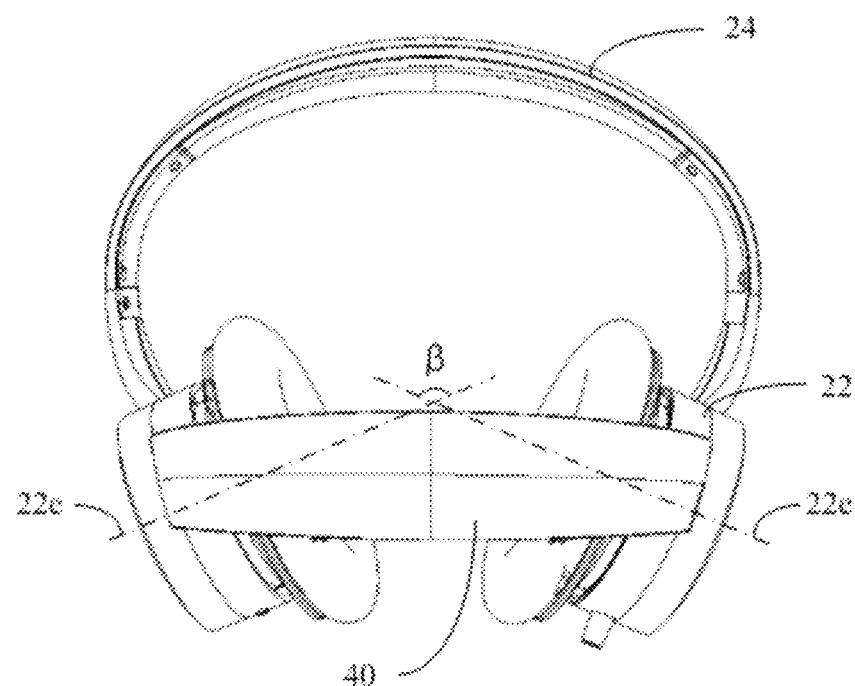
FIG. 3 is a front view of the head mounted electronic device in FIG. 1.

When the head mounted electronic device 10 is assembled and in use, without any external force, as illustrated by FIG. 1, the display portion 40 is capable of rotating to the position defining an angle of approximately 90 degrees relative to the headphone 20. It should be pointed out that, the 90 degrees here is only an example, different wearing habits of the users will change the angle, for example, it can be 70 degrees, 80 degrees, 100 degrees or others. Here, the ends of the two speakers 22 remote from the elastic belt 24 are slant toward each other, as illustrated by FIG. 3. The third axes 22e of two speakers 22 define a second angle β therebetween. The arrangement of the second angle β makes the speakers 22 more comfortable to wear.

Referring to FIG. 1 and FIG. 3, when the display portion 40 is rotated to be substantially overlapping with the headphone 20, the display portion 40 rotates in an upward direction as shown in FIG. 3. Because the third axis 22e is slant relative to a horizontal direction in FIG. 3, and the main body 42 is rigid and not stretchable, the right speaker 22 shown in FIG. 1 and FIG. 3 rotates counterclockwise (as shown by an arrow located at the second axis 26d in FIG. 1) along the second axis 26d during the upward rotation of the display portion 40. That is to say, the right speaker 22 has a side thereof, adjacent to the first blind hole 26b, rotating in a direction toward the other speaker 22. The rotation direction of the other speaker 22 is clockwise. Simultaneously, the upward rotation of the display portion 40 compels the right speaker 22 and the right coupling member 26 shown in FIG. 1 and FIG. 3 to rotate in directions shown by the arrows located thereon along the first axis 25d. That is to say, the right speaker 22 has a side thereof, adjacent to the second protrusion pole 26c, rotating in a direction away from the other speaker 22.

It can be known from the aforesaid description, in the illustrated embodiment, by constructing the second angle β, the speaker 22 is more comfortable for the ears to wear, to thereby provide better audio effect for the users. Because the third axis 22e is not horizontally arranged any more, the two third axes 22e define the angle therebetween, rather than being collinear, the rotation of the display portion 40 relative to the headphone 20 becomes complicated. Here, when the elastic belt 24 is directly fixed to the speakers 22, that is to say, the movable members 26 are omitted, the elastic belt 24 and the coupling components 44 will be twisted. In the illustrated embodiment, the headphone 20 is constructed with two movable members 26, the rotation of the speaker 22 along the two dimensions permits the speaker 22 to rotate along the first axis 25d and the second axis 26d when compelled by the movement of the display portion 40, to thereby avoid twisting the elastic belt 24 and the coupling component 44, and make the display portion 40 be capable of rotating to the position substantially overlapping with the headphone 20.

In the illustrated embodiment, the main portion 26a of the movable member 26 substantially extends about one quarter of a circle that is to say the first angle α is approximately 90 degrees. However it can be understood that, under a circumstance of other degrees of the angle, the speaker 22 can also generate the rotation along the two dimensions to achieve the aforesaid purpose. Therefore, the first angle is not limited to 90 degrees. Preferably, the first angle is larger than 30 degrees but less than 150 degrees, or is larger than 210 degrees but less than 330 degrees, here, a length of the main portion is changed following that.

In the illustrated embodiment, the second angle β is substantial 150 degrees when the head mounted electronic device 10 is not subject to any external force. However it can be understood that, for different users, the degrees can be changed, so long as that the headphone 20 is more comfortable for the ears. The second angle β is preferably larger than 100 degrees but less than 170 degrees.

Figure 4:
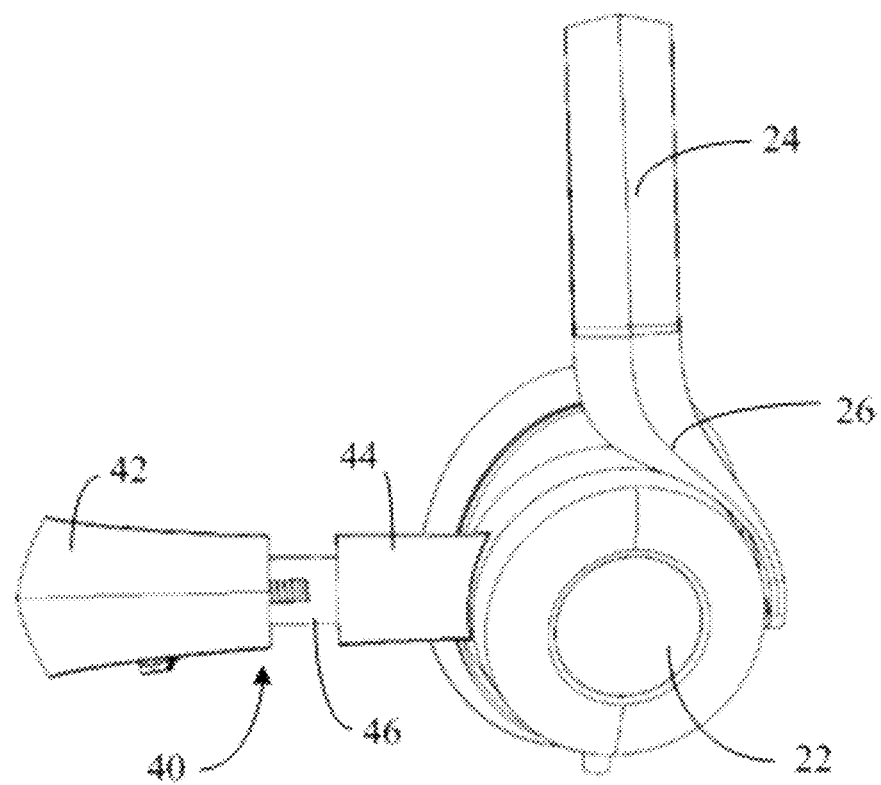
FIG. 4 is a side view of the head mounted electronic device in FIG. 1.

Preferably, each of the coupling components 44 can be translatably coupled to the main portion 42 or the speaker 22, to thereby be capable of moving to a first position adjacent to the main portion 42 or the speaker 22 and moving to a second position remote from the main portion 42 or the speaker 22. Therefore, a distance between the main portion 42 and the eyes of the user can be adjusted. Specifically, referring to FIG. 4, taking an example of that the coupling component 44 is translatably and movably coupled to the main portion 42, the display portion 40 further includes a supporting member 46 extending outwardly from two opposite ends of the main portion 42, the coupling component 44 is slidably coupled to the supporting member 46, to thereby move the main portion 42 closer to or farther away from the speakers 22. A way of the coupling component 44 being translatably and movably coupled to the speaker 22, is similar to the structure connection principle of aforesaid way, here no longer say that.

In the description of the present invention, the terms "first" and "second" are only used for description purpose, which cannot be interpreted as instructions or suggests of the relative importance or implied point the number of the indicated technical characteristics. Thus, the characteristics having the "first" and "second" can express or be implied to include one or more described characteristics. In the description of the invention, the meaning of "a plurality of" is two or more than two, unless it has additionally express and specific limitations.

In the description of the invention, unless it has additionally express and specific definitions and limitations, the terms of "mount", "connect" and "couple" each should have a general understanding. For example, it can be a fixed connection, also can be a detachable connection, or an integral connection; it can be connected directly, also can be connected indirectly through intermediaries, it can be communication of two internal components or interaction relations of two components. For the ordinary skilled person in the art, the specific meaning in the invention of the aforesaid terms can understand according to the concrete situation.

The above description is only optimal implementations of the present invention, not limiting the present invention, any modification, equivalent replacement and improvement, etc., within the spirits and principles of the present invention shall be included in the claimed scope of the present invention.

What is claimed is:

1. A head mounted electronic device comprising a headphone and a display portion wherein the headphone further comprises:
    a C-shaped elastic belt having two coupling ends;
    two movable members, each movable member having a first end and a second end and being rotatably coupled to a corresponding coupling end of the elastic belt via the first end of the movable member, the movable member being configured to rotate with respect to the corresponding coupling end of the elastic belt along a first axis, and
    two speakers, each speaker including a periphery and a body and being rotatably coupled to the second end of a corresponding movable member via the periphery of the speaker, the speaker being configured to rotate with respect to the corresponding movable member around a second axis across both the periphery and the body of the speaker, wherein the second axis and the first axis define a first angle therebetween; and
    the display portion further comprises:
    a main body, configured to produce and project images outwardly; and
    two coupling components, coupled to two opposite ends of the main body and each being rotatably coupled to a corresponding speaker around a respective third axis, wherein the two third axes define a second angle therebetween;
    wherein a folding of the display portion towards a position substantially overlapping with the elastic belt causes each of the two speakers and a corresponding movable member to which the speaker is coupled to rotate with respect to a corresponding coupling end of the elastic belt along a corresponding first axis, thereby avoiding twisting between the elastic belt and the two movable members.

2. The head mounted electronic device as claimed in claim 1, wherein each of the speakers comprises an inner wall configured to transmit sound and an opposite outer wall, with a corresponding third axis extending from the inner wall toward the outer wall.

3. The head mounted electronic device as claimed in claim 2, wherein each movable member comprises the first end rotatably coupled to the corresponding coupling end of the elastic belt along the first axis, the second end rotatably coupled to the corresponding speaker along the second axis, and a curved portion connecting the first end and the second end.

4. The head mounted electronic device as claimed in claim 3, wherein for each of the two speakers, the periphery further comprises a side wall extending from an edge of the outer wall toward the inner wall, the movable member being rotatably coupled to the side wall along the second axis.

5. The head mounted electronic device as claimed in claim 3, wherein each of the two coupling ends comprises one of a first protrusion pole and a first blind hole, the first end of each of the two movable members comprises the other of the first blind hole and the first protrusion pole, the first protrusion pole is rotatably located in the first blind hole, and the first axis is defined by the first protrusion pole or the first blind hole.

6. The head mounted electronic device as claimed in claim 3, wherein each of the two speakers comprises one of a second protrusion pole and a second hole, each of the two movable members comprises the other of the second hole and the second protrusion pole, the second protrusion pole is rotatably located in the second hole, and the second axis is defined by the second protrusion pole or the second hole.

7. The head mounted electronic device as claimed in claim 4, wherein the side wall of each of the two speakers is a cylindrical wall, the third axis being a central axis of the cylindrical wall, and each of the coupling components is rotatably coupled to the side wall of a corresponding speaker along the third axis.

8. The head mounted electronic device as claimed in claim 7, wherein each of the two coupling components adjacent to a corresponding speaker comprises a second cylindrical wall coupled to the side wall of the corresponding speaker to be capable of rotating along the third axis.

9. The head mounted electronic device as claimed in claim 1, wherein the third axis of each of the two speakers is substantially perpendicular to a corresponding first axis and a corresponding second axis.

10. The head mounted electronic device as claimed in claim 1, wherein the second angle is larger than 100 degrees and less than 170 degrees.

11. The head mounted electronic device as claimed in claim 1, wherein the first angle is larger than 30 degrees and less than 150 degrees.

12. The head mounted electronic device as claimed in claim 1, wherein each of the coupling components is translatably and movably coupled to the main portion or the speaker, to be capable of moving to a first position adjacent to the main portion or the speaker and moving to a second position remote from the main portion or the speaker.

13. The head mounted electronic device as claimed in claim 1, wherein each of the two movable members is translatably and movably coupled to the coupling end to be capable of moving to a first position adjacent to the elastic belt and moving to a second position remote from the elastic belt.

* * * * *